(12) United States Patent  
Oeda et al.

(10) Patent No.: US 7,136,103 B2
(45) Date of Patent: Nov. 14, 2006

(54) DIGITAL CAMERA AND COLOR ADJUSTING APPARATUS

(75) Inventors: Hideshi Oeda, Osaka (JP); Kazuto Yoshii, Osaka (JP); Mitsuaki Kurokawa, Osaka (JP); Hideharu Baba, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 672 days.

(21) Appl. No.: 10/137,431

(22) Filed: May 3, 2002

(65) Prior Publication Data

US 2002/0167598 A1 Nov. 14, 2002

(30) Foreign Application Priority Data

May 11, 2001 (JP) .............................. 2001-140869
May 29, 2001 (JP) .............................. 2001-159878

(51) Int. Cl.
 *H04N 5/222* (2006.01)
(52) U.S. Cl. ................ 348/333.02; 348/223.1
(58) Field of Classification Search ........... 348/333.01, 348/333.02, 333.12, 222.1, 223.1, 224.1, 348/229
See application file for complete search history.

(56) References Cited

U.S. PATENT DOCUMENTS

| | | | | |
|---|---|---|---|---|
| 4,951,134 A | * | 8/1990 | Nakasima et al. ............. 348/71 |
| 6,188,431 B1 | * | 2/2001 | Oie .......................... 348/211.5 |
| 6,567,120 B1 | * | 5/2003 | Hamamura et al. .... 348/207.99 |
| 6,778,216 B1 | * | 8/2004 | Lin ........................ 348/333.11 |
| 2001/0030694 A1 | * | 10/2001 | Abe ........................... 348/223 |
| 2002/0080251 A1 | * | 6/2002 | Moriwaki ................... 348/232 |
| 2004/0227823 A1 | * | 11/2004 | Shimizu .................. 348/223.1 |

FOREIGN PATENT DOCUMENTS

| | | | |
|---|---|---|---|
| CN | 1213927 A | | 4/1999 |
| JP | 02-90584 | | 7/1990 |
| JP | 10-224647 | | 8/1998 |
| JP | 11-088906 | | 3/1999 |
| JP | 2001-177846 A | * | 12/1999 |
| JP | 2001-069526 | | 3/2001 |

* cited by examiner

*Primary Examiner*—Tuan Ho
*Assistant Examiner*—Anthony J. Daniels
(74) *Attorney, Agent, or Firm*—Westerman, Hattori, Daniels & Adrian, LLP.

(57) ABSTRACT

A digital camera includes a reference value table and a setting change-use table. The reference value table holds a plurality of reference values which respectively corresponds to a plurality of representative colors, and the setting change-use table holds a plurality of target values which respectively corresponds to a plurality of representative colors. Image data of a photographed object is applied to a signal processing circuit, and subjected to a color adjustment based on the reference value held by the reference value table and the target value held by the setting change-use table. An image based on the image data to which the color adjustment is subjected is displayed on a monitor in real-time. When a dial key is operated, the target value of a desired representative color held on the setting change-use table is changed. Therefore, a color tone of a real-time image displayed on the monitor also changes in response to an operation of the dial key.

9 Claims, 11 Drawing Sheets

| N | HUE(H) | CHROMA(C) | LUMINANCE(L) | COLOR |
|---|---|---|---|---|
| 1 | 55 | 690 | 184.515 | Mg |
| 2 | 118 | 530 | 121.845 | R |
| 3 | 160 | 610 | 184.893 | Ye |
| 4 | 225 | 780 | 126.177 | G |
| 5 | 275 | 610 | 94.075 | Cy |
| 6 | 338 | 610 | 187.512 | B |

| N | HUE(H) | CHROMA(C) | LUMINANCE(L) | COLOR |
|---|---|---|---|---|
| 1 | 48 | 530 | 184.154 | Mg |
| 2 | 115 | 720 | 96.69 | R |
| 3 | 163 | 690 | 160.774 | Ye |
| 4 | 223 | 900 | 84.193 | G |
| 5 | 280 | 700 | 73.102 | Cy |
| 6 | 340 | 540 | 189.011 | B |

DIGITAL CAMERA AND COLOR ADJUSTING APPARATUS

BACKGROUND OF THE INVENTION

1. Field of the Invention

The present invention relates to a digital camera. More specifically, the present invention relates to a digital camera which subjects a photographed image signal to a color adjustment based on a color adjustment value held in a memory.

The present invention also relates a color adjusting apparatus. More specifically, the present invention relates to a color adjusting apparatus applied in a digital camera and subjecting an image signal to a color adjustment based on a color adjustment values stored in a first memory.

2. Description of the Prior Art

A color reproduction characteristic of an image photographed by a digital camera is determined by what kind of signal processing is subjected to an image signal outputted from an image sensor. Accordingly, signal processing technology serves as an important element in improving the color reproduction characteristic of the photographed image. However, in a conventional digital camera, the color adjustment applied to the photographed image under various circumstances was difficult to perform, and there was a tendency that the color adjustment was suitable for an object photographed in a good condition. In addition, it was impossible for a user to change a setting of the color adjustment value as he pleased on a camera, and there was no other alternative but to apply the color reproduction characteristic one image by one image toward the photographed image on a personal computer. That is, its operability for color adjustment was not good.

SUMMARY OF THE INVENTION

Therefore, it is a primary object of the present invention to provide a novel digital camera.

It is another object of the present invention to provide a digital camera capable of improving an operability of a color reproduction characteristic, and also easily comprehending what colors are to be reproduced by a changed color adjustment value.

It is the other object of the present invention to provide a novel color adjustment apparatus.

It is further object of the present invention to provide a color reproduction characteristic apparatus capable of improving an operability.

A digital camera, comprises: a holder for holding a plurality of color adjusting values which respectively corresponds to a plurality of representative colors; a photographer for photographing an object and outputting an image signal of the photographed object; an adjuster for subjecting the image signal outputted from the photographer to a color adjustment based on the plurality of color adjusting values held by the holder; an image displayer for displaying in real-time an image based on the image signal to which the color adjustment is subjected; and a changer for arbitrarily changing the plurality of color adjusting values held by the holder.

The holder holds a plurality of color adjusting values which respectively corresponds to a plurality of representative colors. When an image signal of an object is outputted from the photographer, the adjuster subjects the image signal to a color adjustment based on a plurality of color adjusting values held by the holder. The image based on the image signal to which the color adjustment is subjected is displayed by the image displayer in real-time. Herein, the plurality of color adjusting values held by the holder are arbitrarily changed by the changer. A color tone of the image being displayed in real-time changes corresponding to a change of the color adjusting value. This makes it possible to increase operability in the color adjustment and also to easily comprehend what kinds of colors are to be reproduced by the changed color adjusting value.

It is preferred that a selection of a desired representative color be accepted out of the plurality of representative colors by a first acceptor, and a change instruction of the color adjusting value be accepted by a second acceptor. At this time, the color adjusting value changer changes color adjusting values corresponding to the desired representative color in response to the change instruction.

In addition, a color adjusting value corresponding to at least one of the representative colors out of the plurality of color adjusting values held by the holder may be displayed by the adjusting value displayer.

Furthermore, a color in accordance with the color adjusting value corresponding to at least one of the representative colors out of the plurality of color adjusting values held by the holder may be displayed by the color displayer.

In a case that each of the color adjusting values includes reference values and target values, the adjuster carries out the color adjustment based on the reference values and the target values, and the changer changes the target values.

Preferably, the color adjusting value is a numerical value which defines at least one of a hue and a chroma.

According to the present invention, a color adjusting apparatus which subjects an image signal to a color adjustment based on a color adjusting values stored in a first memory, comprises: a first sample displayer for displaying a first color sample in accordance with the color adjusting values stored in the first memory; a transferor for transferring the color adjusting values stored in the first memory to a second memory; a second color sample displayer for displaying a second color sample in accordance with the color adjusting values stored in the second memory; an acceptor for accepting a change instruction of the first color sample; and a changer for changing the color adjusting values stored in the first memory in response to the change instruction.

A color adjusting process toward the image signal is carried out based on the color adjusting values stored in the first memory. The first color sample displayer displays a first color sample in accordance with the color adjusting values stored in the first memory. In addition, the color adjusting values stored in the first memory is transferred to the second memory by the transferor, and the second color sample displayer displays the second color sample in accordance with the color adjusting values stored in the second memory. If the acceptor accepts a change instruction of the first color sample, the color adjusting values stored in the first memory is changed by the changer. This changes a color tone of the image signal to which the color adjustment is subjected and a color tone of the first color sample displayed by the first color sample displayer. It is noted that the color tone of the second color sample displayed by the second color sample displayer is not changed. That is, the first color sample according to a color adjusting value after the change and the second color sample according to the color adjusting value before the change are displayed. Accordingly, it is possible to use the first color sample and the second color sample as a threshold of the color adjustment, thus increasing operability.

In a case that the second color sample displayer displays the second color sample in a vicinity of the first color sample, a change of the color tone of the first color sample is easily comprehended by comparing the second color sample therewith.

In a case that the object is photographed by the photographer, the image signal to which the color adjustment is subjected is an image signal outputted from the photographer. In this case, it is possible to spontaneously adjust the color tone of the photographed object.

Furthermore, in a case that an object image based on the image signal to which the color adjustment is subjected is displayed by the object image displayer in real-time, the color tone of the image signal is changed in response to the change instruction of the first color sample.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
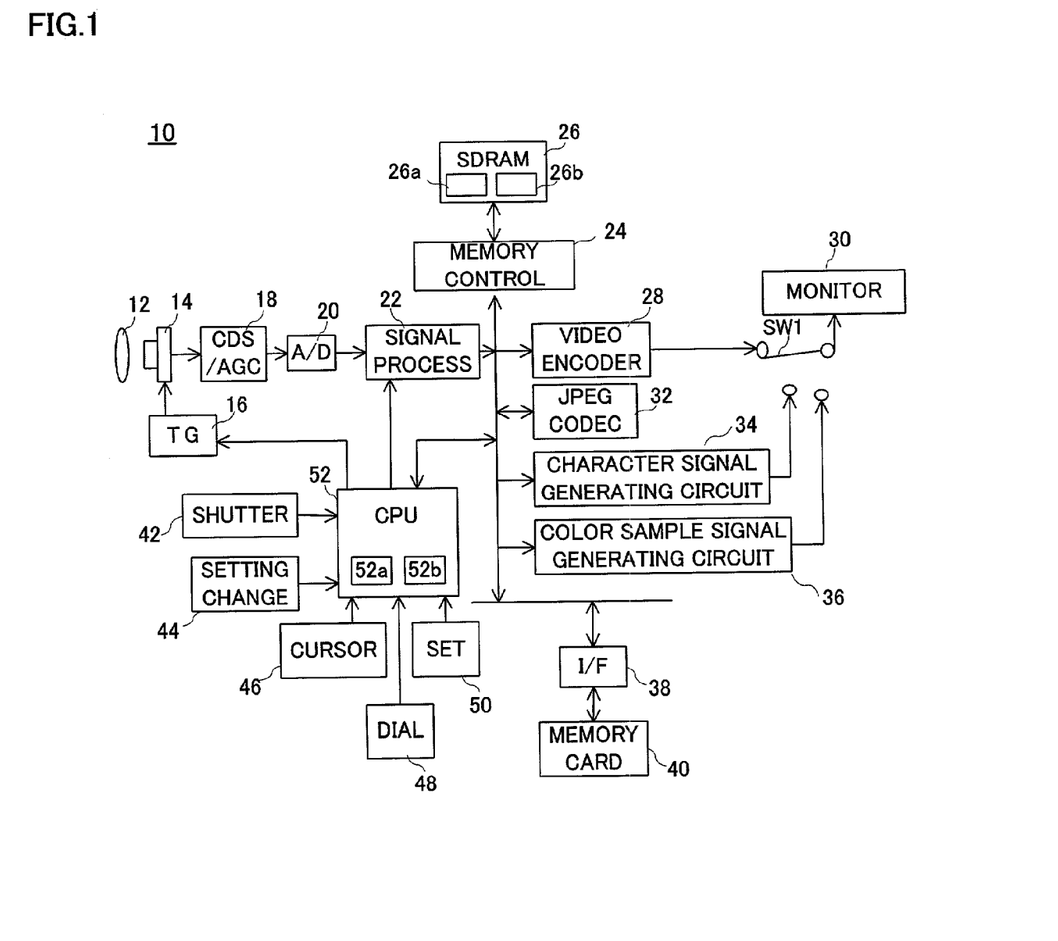
FIG. 1 is a block diagram showing one embodiment of the present invention.

Referring to FIG. 1, a digital camera 10 of this embodiment includes a focus lens 12. An optical image of an object is incident on a light-receiving-surface of a CCD imager 14 via the focus lens 12. On the light-receiving surface, a camera signal (raw image signal) corresponding to the incident optical image is generated by a photoelectric conversion. It is noted that the light-receiving surface is covered by a color filter of the Bayer pattern (not represented), and each of pixel signals forming the camera signal has only one color information (color component) of any R, G or B.

When a power is inputted, a processing instruction is applied to a timing generator (TG) 16 from a CPU 52, whereby the CCD imager 14 is driven by the TG 16. The CCD imager 14 repeats reading out the camera signal generated by the photoelectric conversion at a predetermined frame rate. The read camera signal of each frame is converted into a digital signal by an A/D converter 20 via a well-known noise removal and a level adjustment in a CDS/AGC circuit 18.

A signal processing circuit 22 subjects the camera data of each frame outputted from the AID converter 20 to signal processings such as color separation, white balance adjustment, color adjustment (color tone correction), YUV conversion, etc., so as to generate image data formed of a luminance component (Y data) and color difference components (U data, V data). The generated image data is applied to a memory control circuit 24, and written into an image data storing area 26a of an SDRAM 26 by the memory control circuit 24.

A video encoder 28 instructs the memory control circuit 24 to read out the image data stored in the image data storing area 26a corresponding to the processing instruction from the CPU 52. In addition, the video encoder 28 encodes the read image data of each frame into a composite video signal according to an NTSC format, and supplies the encoded composite video signal to a monitor 30 via a switch SW1. Therefore, a real-time moving image of the object (a through image) is displayed on the monitor 30.

It is noted that the switch SW1 is connected to a character signal generating circuit 34 when a character signal is outputted from the character signal generating circuit 34, and connected to a color sample signal generating circuit 36 when a color sample signal is outputted from the color sample signal generating circuit 36. The character signal or the color sample signal is applied to the monitor 30 via the switch SW1, thereby a desired character or a desired color sample is displayed on the screen in an OSD manner.

If a shutter button 42 is depressed by an operator, the CPU 52 applies a compression instruction to a JPEG CODEC 32. The JPEG CODEC 32 instructs the memory control circuit 24 to read out one frame of the image data stored in the image data storing area 26a, and subjects the read image data to a compression process in accordance with a JPEG format. The JPEG CODEC 32 applies the compressed image data generated by the compression process to the memory control circuit 24. The compressed image data is stored in a compressed data storing area 26b by the memory control circuit 24.

Upon completing the storing process of the compressed image data, the CPU 52 reads out the compressed image data from the compressed data storing area 26b through the memory control circuit 24, and records the read compressed image data into a memory card 40 through an I/F circuit 38, thereby an image file is generated in the memory card 40. It is noted that the memory card 40 is a detachable non-volatile recording medium and becomes accessible by the CPU 52 when attached to a slot (not shown).

Figure 2:
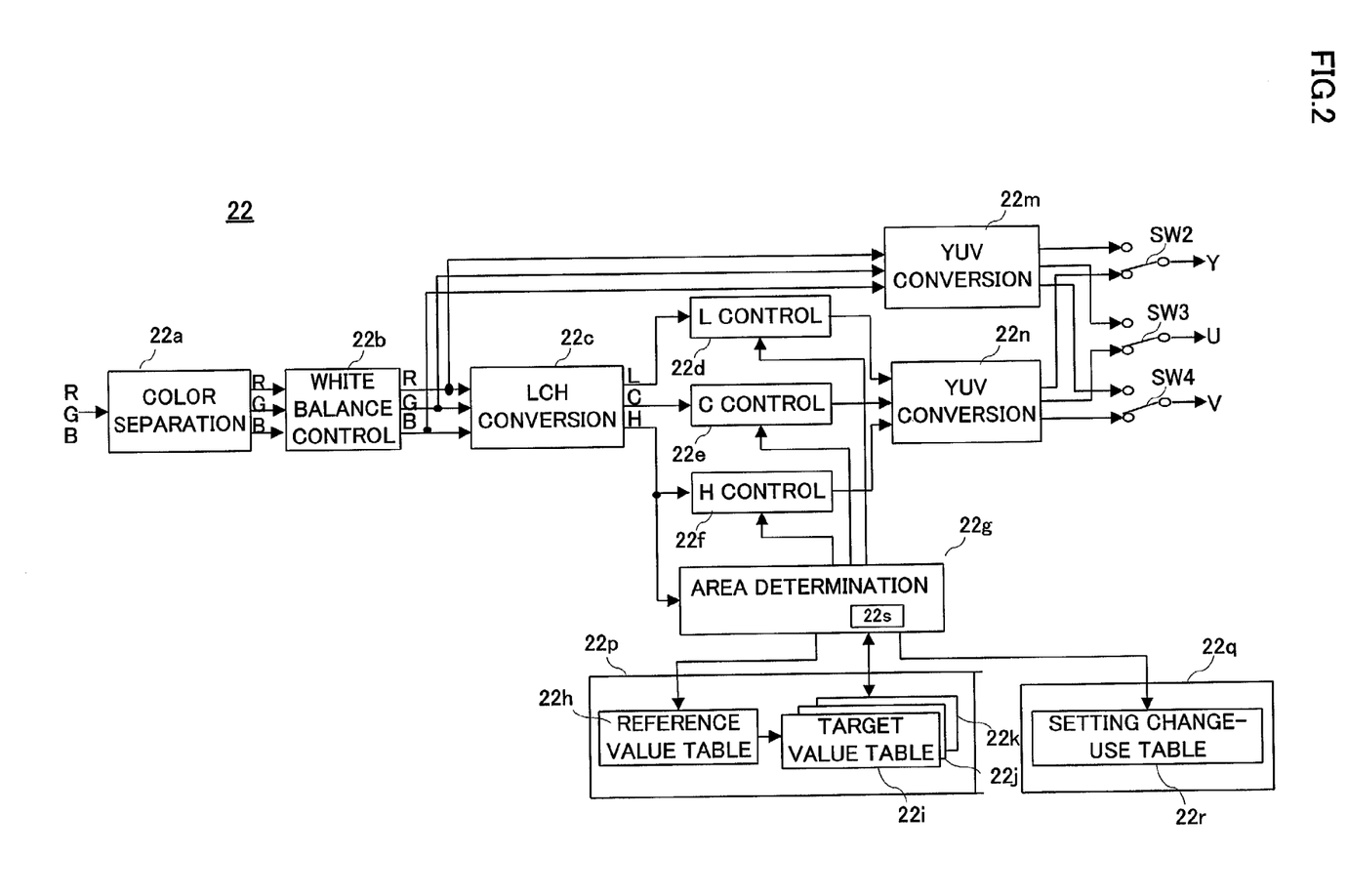
FIG. 2 is a block diagram showing one example of a signal processing circuit.

The signal processing circuit 22 is constituted as, shown in FIG. 2. The camera data outputted from the A/D converter 20 is subjected to the color separation by a color separation circuit 22a. That is, since each of pixel data forming the camera data has no more than any one of the R component, the G component, and the B component, the two color components lacking in each pixel are supplemented by the color separation circuit 22a. The R component, the G component, and the B component forming each pixel are simultaneously outputted from the color separation circuit 22a. The R component, the G component, and the B component outputted one pixel by one pixel are applied to an LCH conversion circuit 22c via a white balance adjusting circuit 22b, and converted into an L component (luminance component), a C component (chroma component), and an H component (hue component).

The converted L component, the C component, and the H component are respectively applied to an L adjusting circuit 22d, a C adjusting circuit 22e, and an H adjusting circuit 22f. The L adjusting circuit 22d, the C adjusting circuit 22e, and the H adjusting circuit 22f respectively subject the inputted L component, the C component, and the H component to predetermined operations so as to evaluate a corrected L component, a corrected C component, and a corrected H component. The corrected L component, the corrected C component, and the corrected H component are then converted into a Y component, a U component, and a V component by a YUV conversion circuit 22n later, and the converted Y component, the U component, and the V component are respectively outputted via switches SW2, SW3, and SW4. Herein, the YUV conversion circuit 22n performs a so-called 4:2:2 conversion (or 4:1:1 conversion), and each of the Y component, the U component, and the V component outputted from the switches SW2–SW4 has a 4:2:2 (or 4:1:1) ratio.

It is noted that the switches SW2–SW4 are connected to a YUV conversion circuit 22m only when a predetermined instruction is outputted from an inspecting apparatus in an inspecting process. At this time, the Y component, the U component, and the V component generated in the YUV conversion circuit 22m based on the R component, the G component, and the B component outputted from the white balance adjusting circuit 22b are outputted via the switches SW2–SW4. The YUV conversion circuit 22m also subjects a so-called 4:2:2 conversion (or 4:1:1 conversion), and the Y component, the U component, and the V component are outputted at a 4:2:2 (or 4:1:1) ratio from the switches SW2–SW4.

The H component outputted from the LCH conversion circuit 22c is also applied to an area determining circuit 22g. The area determining circuit 22g determines an area to which the H component applied from the LCH conversion circuit 22c belongs by referring to a reference value table 22h. The area determining circuit 22g further reads out two reference values corresponding to a determination result from the reference value table 22h, and reads out two target values corresponding to the determination result from any one of target value tables 22i–22k, or a setting change-use table 22r.

Figure 3:
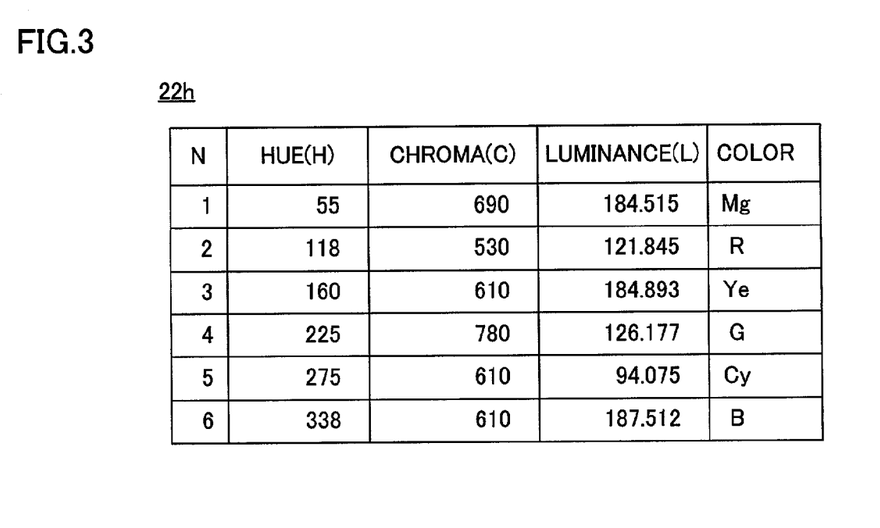
FIG. 3 is an illustrative view showing a reference value table.
Figure 5:
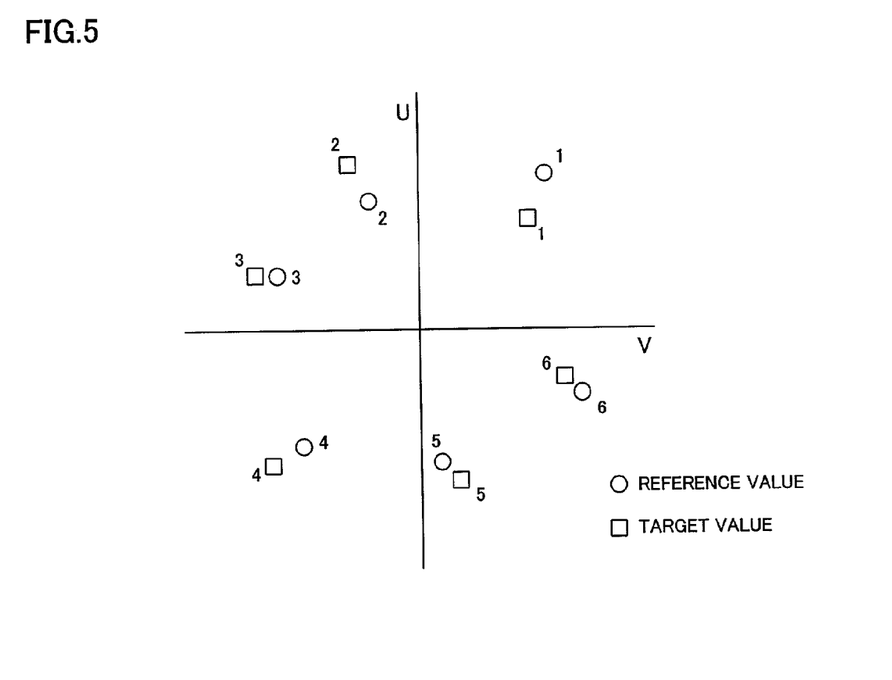
FIG. 5 is a color distribution diagram on which reference values and target values are arranged.

Referring to FIG. 3, six reference H component values, six reference C component values, and six reference L component values are written on the reference value table 22h. H, C, and L respectively mean hue, chroma, and luminance, and each of which is a parameter for a color adjustment. The same reference value number N (=1 to 6) is assigned to the reference H component value, the reference C component value, and the reference L component value associated with each other, and the reference value is defined by three component values (the reference H component value, the reference C component value, and the reference L component value) having the common reference number. These six reference values respectively correspond to six representative colors (Mg, R, Ye, G, Cy, and B), and distributed in a YUV space as shown in FIG. 5 and FIG. 6.

Figure 6:
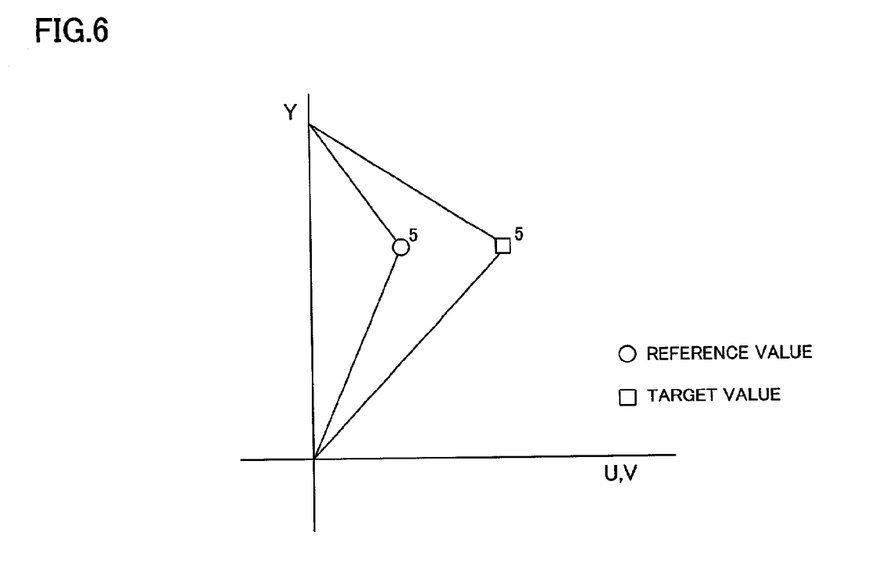
FIG. 6 is a luminance distribution diagram on which reference values and target values are arranged.

It is noted that only the reference value having "5" as the reference number is shown in FIG. 6.

Figure 4:
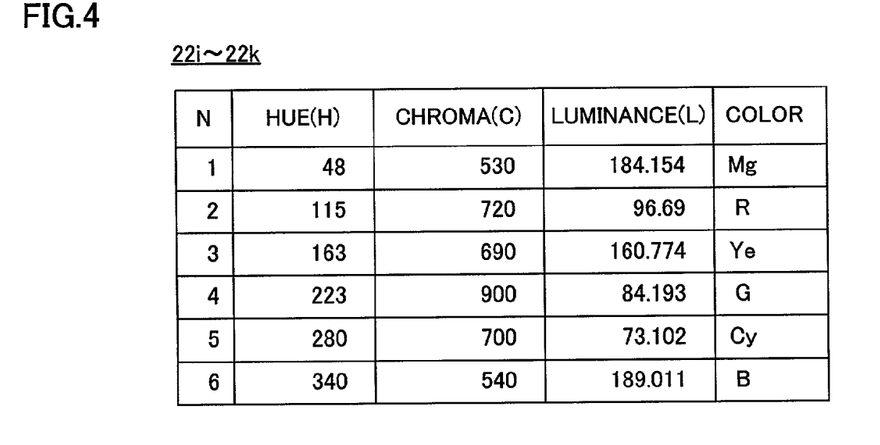
FIG. 4 is an illustrative view showing a target value table.

On the other hand, each of the target value tables 22i–22k is formed as shown in FIG. 4. Similar to the reference value table 22h shown in FIG. 3, six target H component values, six target C component values, and six target L component values respectively associated with the hue (H), the chroma (C), and the luminance (L) are set, and the target value is defined by the target H component values, the target C component values, and the target L component value assigned to the same target value number N (=1 to 6). These six target values also respectively correspond to the six representative colors (Mg, R, Ye, G, Cy, and B). When the target H component values, the target C component values, and the target L component values indicate numerical values shown in FIG. 4, the six target values are distributed in the YUV space as shown in FIG. 5 and FIG. 6. It is noted that only the target value having "5" as the reference value number is shown in FIG. 6.

The target value tables 22i–22k are different from the reference value table 22h in that each target value can be changed. That is, while the reference H component values, the reference C component values, and the reference L component values stored in the reference value table 22h are previously fixed in a manufacturing process, and not freely changed by the operator, the reference H component values, the reference C component values, and the reference L component values stored in the target value tables 22i–22k can be arbitrarily changed by the operator.

When any one of the target value tables 22i–22k is selected for changing the target values, the target values set on the selected target value table are copied on the setting change-use table 22r. When the changing operation is carried out, a target value on the setting change-use table 22r is changed. At this time, the area determination by the area determining circuit 22g is carried out by referring to the reference value table 22h and the setting change-use table 22r. Upon completing the changing operation, the target values set on the setting change-use table 22r are returned to the reading source target value table. The table used for the area determination is also returned to the reading source target value table from the setting change-use table 22r.

It is noted that the reference value table 22h and the target value tables 22i–22k are stored in a non-volatile memory 22p, and the setting change-use table 22r is stored in a volatile memory 22q. Furthermore, the target value tables 22i–22k correspond to modes 1–3, respectively.

Figure 7:
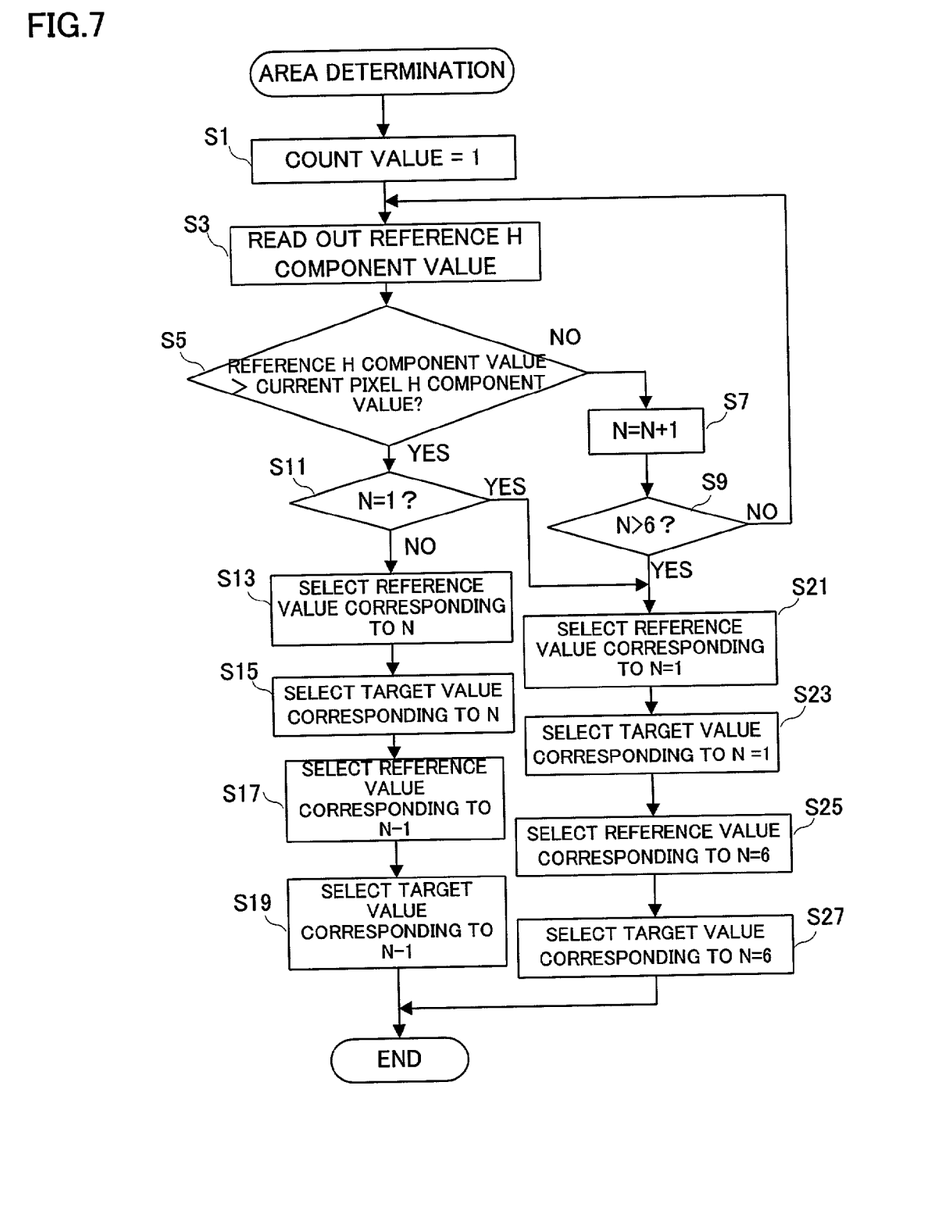
FIG. 7 is a flowchart showing a portion of an operation of an area determining circuit.

The area determining circuit 22g executes a process according to a flowchart shown in FIG. 7 one pixel by one pixel so as to carry out an area determination for each pixel forming the image data and a selection of reference values and target values corresponding to the determination result. Firstly, a count value N of a counter 22s is set to "1" in a step S1, and the reference H component value corresponding to the count value N is read out from the reference value table 22h in a step S3. In a step S5, the H component value of a current pixel inputted from the LCH conversion circuit 22 (current pixel H component value) is compared with the reference H component value read out from the reference value table 22h.

If a condition where the reference H component value is greater than (>) the current pixel H component value is satisfied, the process proceeds from the step S5 to a step S11 so as to compare the count value N with "1". Then, if a condition where N is equal to (=) 1 is satisfied, steps S21–S27 are carried out. However, if the condition that N is greater than (>) 1 is satisfied, steps S13–S19 are carried out.

On the other hand, if a condition where the reference H component value is equal to or less than (≦) the current pixel H component is satisfied, the counter 22s is incremented in a step S7, and the renewed count value N is compared with "6" in a subsequent step S9. Then, if a condition where N is equal to or less than (≦) 6 is satisfied, the process returns to the step S3. However, if a condition where N is greater than (>) 6 is satisfied, then the steps S21–S27 are processed.

The reference H component value, the reference C component value, and the reference L component value which correspond to the current count value N are selected as Hr1, Cr1, and Lr1 from the reference value table 22b in the step S13, and the target H component values, the target C component values, and the target L component value which correspond to the current count value N are selected as Ht1, Ct1, and Lt1 from any one of either the target value tables 22i–22k and the setting change-use table 22r in the step S15. Furthermore, the reference H component vale, the reference C component value, and the reference L component value which correspond to the count value N−1 are selected as Hr2, Cr2, and Lr2 from the reference value table 22h in the step S17, and the target H component values, the target C component values, and the target L component value which correspond to the count value N−1 are selected as Ht2, Ct2, and Lt2 from any one of the target value tables 22i–22k and the setting change-use table 22r in the step S19.

On the other hand, the reference H component value, the reference C component value, and the reference L component value which correspond to the count value N=1 are selected as Hr1, Cr1, and Lr1 from the reference value table 22h in the step S21, and the target H component values, the target C component values, and the target L component value which correspond to the count value N=1 are selected as Ht1, Ct1, and Lt1 from any one of the target value tables 22i–22k and the setting change-use table 22r in the step S23. Furthermore, the reference H component value, the reference C component value, and the reference L component value which correspond to the count value N=6 are selected as Hr2, Cr2, and Lr2 from the reference value table 22h in the step S25, and the target H component values, the target C component values, and the target L component value which correspond to the count value N=6 are selected as Ht2, Ct2, and Lt2 from any one of the target value tables 22i–22k and the setting change-use table 22r in the step S27.

Thus, two reference values which sandwich the current pixel value with respect to a hue and two target values corresponding to the two reference values are detected. It is noted that a reading source of the target values in steps S21, S23, S25, and S27 are the same with each other.

The reference H component values Hr1 and Hr2 and the target H component values Ht1 and Ht2 are applied to the H adjusting circuit 22f. Furthermore, the reference C component values Cr1 and Cr2 and the target C component values Ct1 and Ct2 are applied to the C adjusting circuit 22e. Moreover, the reference L component values Lr1 and Lr2 and the target L component values Lt1 and Lt2 are applied to the L adjusting circuit 22d.

Figure 8:
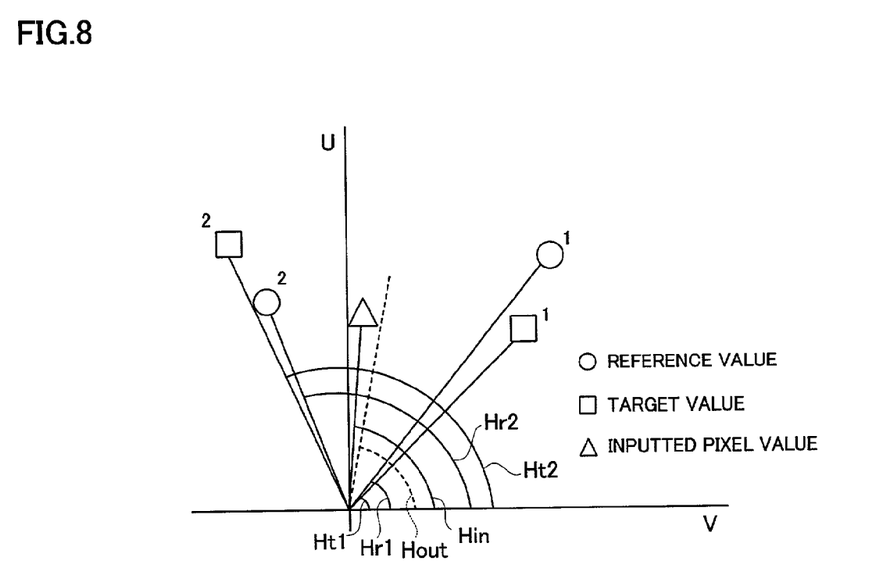
FIG. 8 is an illustrative view showing a portion of an operation of the FIG. 1 embodiment.

The H adjusting circuit 22f fetches a current pixel H component value Hin from the LCH conversion circuit 22c, and calculates a corrected H component value Hout in accordance with an Equation 1. The calculated corrected H component value Hout is shifted to an angle indicated by a dotted line in FIG. 8.

$$Hout=(Ht2\cdot\beta+Ht1\cdot\alpha)/(\alpha+\beta)$$

$$\alpha=|Hr2-Hin|$$

$$\beta=|Hr1-Hin| \qquad \text{(Equation 1)}$$

In addition, the H adjusting circuit 22f outputs angle data α(=|Hr2−Hin|) and β(=|Hr1−Hin|) to the C adjusting circuit 22e and the L adjusting circuit 22d and also outputs angle data γ (=|Ht2−Hout|) and δ (=|Ht1−Hout|) to the L adjusting circuit 22d.

Figure 9:
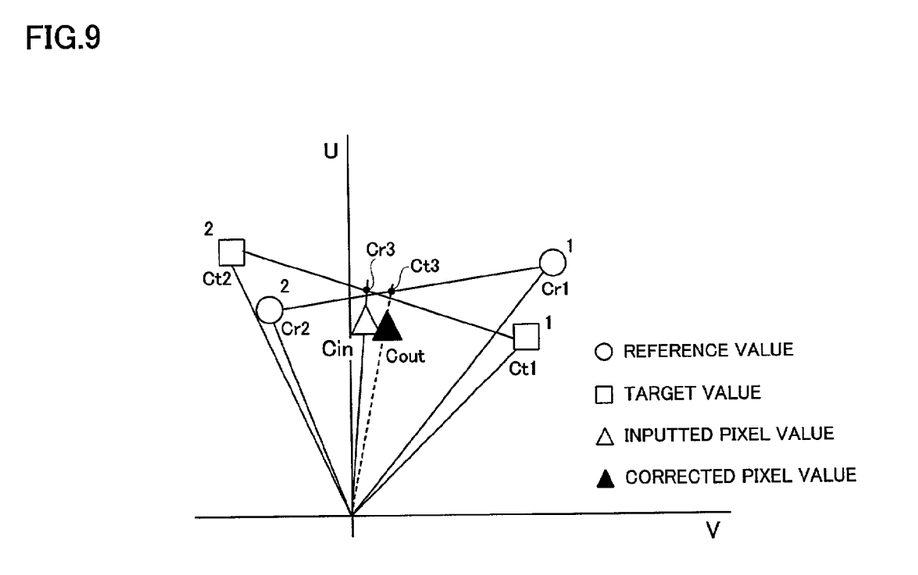
FIG. 9 is an illustrative view showing another portion of the operation of the FIG. 1 embodiment.

The C adjusting circuit 22e subjects a current pixel C component value Cin fetched from the LCH conversion circuit 22c to an operation shown in an Equation 2, and calculates a corrected C component value Cout shown in FIG. 9.

$$Cout=Cin\cdot\{Ct1+(Ct2-Ct1)\cdot\beta/(\alpha+\beta)\}/\{Cr1+(Cr2-Cr1)\cdot\beta/(\alpha+\beta)\}$$

Furthermore, the C adjusting circuit 22e performs a calculation of an Equation 3 so as to seek a C component value Cr3 at intersecting coordinates of a straight line connecting CH system coordinates (0, 0) and (Cin, Hin) and a straight line connecting CH system coordinates (Cr1, Hr1) and (Cr2, Hr2), and a C component value Ct3 at intersecting coordinates of a straight line connecting CH system coordinates (0, 0) and (Cout, Hout) and a straight line connecting CH system coordinates (Ct1, Ht1 ) and (Ct2, Ht2). Then, the calculated C component value Cr3 and the Ct3 are outputted to the L adjusting circuit 22d along with the aforementioned current pixel C component value Cin and the corrected C component value Cout.

$$Cr3=Cr1+(Cr2-Cr1)\cdot\beta/(\alpha+\beta)$$

$$Ct3=Ct1+(Ct2-Ct1)\cdot\delta/(\gamma+\delta) \qquad \text{(Equation 3)}$$

Figure 10:
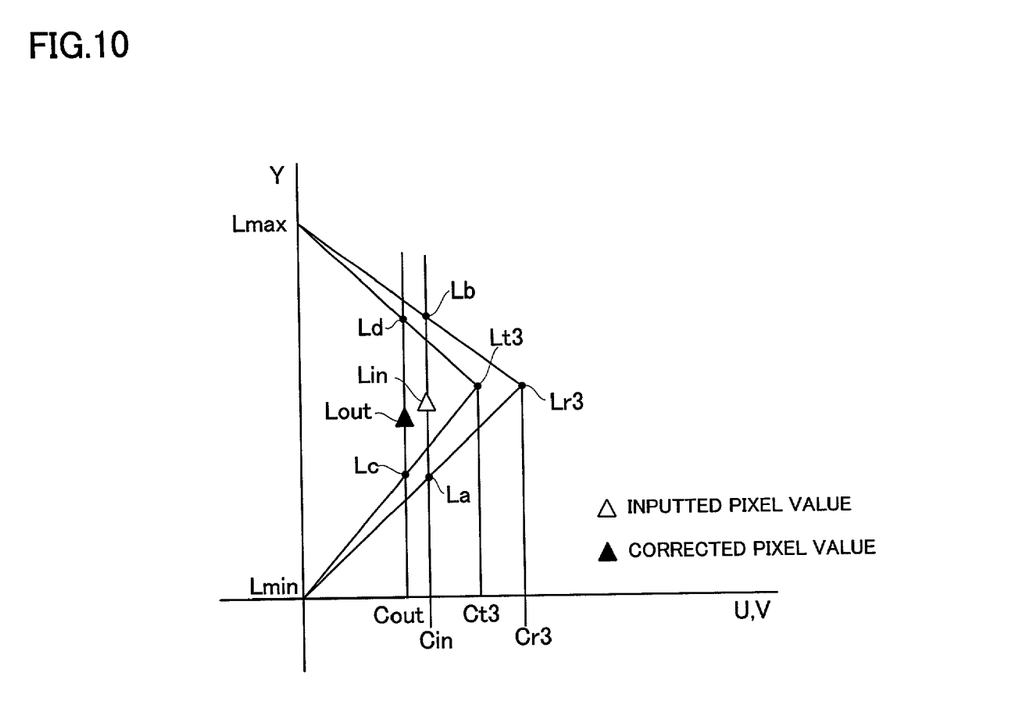
FIG. 10 is an illustrative view showing the other portion of the operation of the FIG. 1 embodiment.

The L adjusting circuit 22d fetches a current pixel L component value Lin from the LCH conversion circuit 22c so as to evaluate a corrected L component value Lout shown in FIG. 10 according to an Equation 4. Lmax and Lmin shown in FIG. 10 are a maximum value and a minimum value of L (luminance) to be reproduced, respectively. The Lmax and the Lmin are to be set to a register, and also arbitrarily changed. The current pixel value (inputted pixel value) exists on a surface formed of LCH system coordinates (Lmax, 0, 0), (Lmin, 0, 0), and (Lr3, Cr3, Hin) (surface on which the YUV space is carved out by the hue Hin). On the other hand, the corrected pixel value exists on a surface formed of LCH system coordinates (Lmax, 0,0), (Lmin, 0, 0), and (Lt3, Ct3, Hout) (surface on which the YUV space is carved out by the hue Hout).

$$Lout=(Lin-La)\cdot(Ld-Lc)/(Lb-La)+Lc$$

$$La=Cin/Cr3\cdot(Lr3-Lmin)$$

$$Lb=Cin/Cr3\cdot(Lr3-Lmax)+Lmax$$

$$Lc=Cout/Ct3\cdot(Lt3-Lmin)$$

$$Ld=Cout/Ct3\cdot(Lt3-Lmax)+Lmax$$

$$Lr3=Lr1+(Lr2-Lr1)\cdot\beta/(\alpha+\beta)$$

$$Lt3=Lt1+(Lt2-Lt1)\cdot\delta/(\gamma+\delta) \qquad \text{(Equation 4)}$$

The corrected pixel value is defined by the corrected H component value Hout, the corrected C component value Cout, and the corrected L component value Lout thus evaluated. It is noted that the current pixel value is defined by the current pixel H component value Hin, the current pixel C component value Cin, and the current pixel L component value Lin outputted from the LCH conversion circuit 22c.

Figure 11:
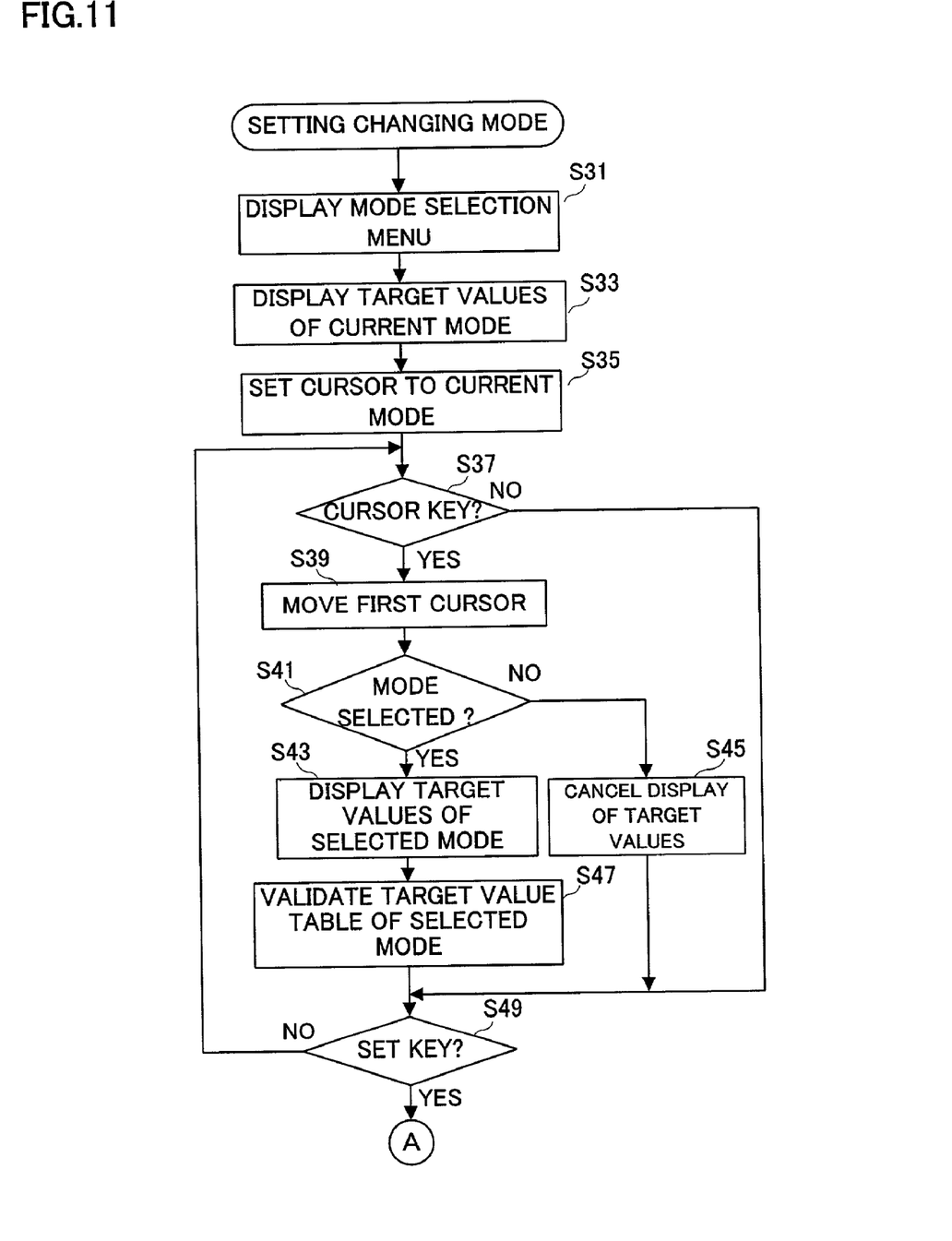
FIG. 11 is a flowchart showing a portion of an operation of a CPU in a setting change mode.
Figure 12:
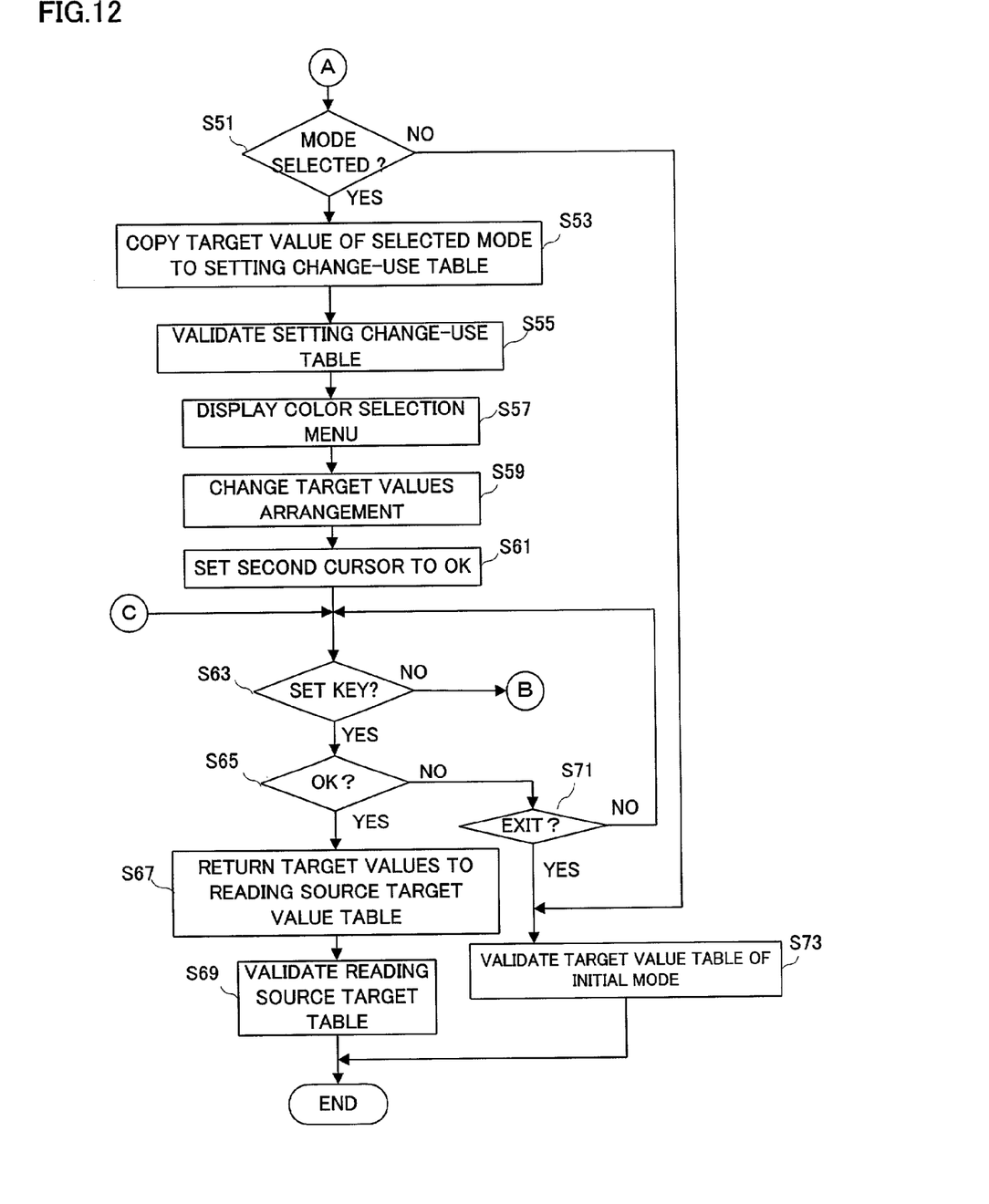
FIG. 12 is a flowchart showing another portion of the operation of the CPU in the setting change mode.
Figure 13:
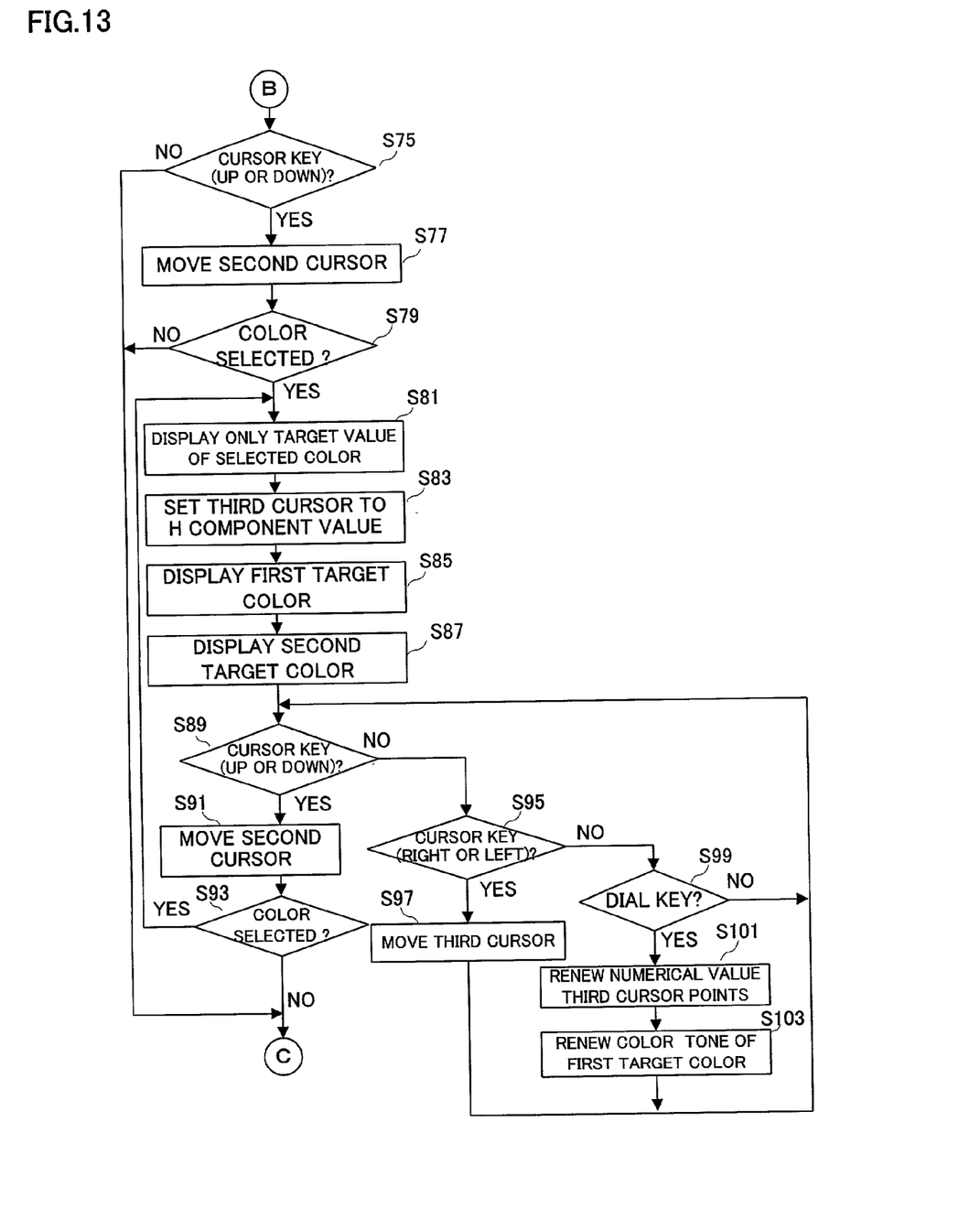
FIG. 13 is a flowchart showing the other portion of the operation of the CPU in the setting change mode.

If the operator operates a setting change key 44 so as to select a setting change mode in a state where the through image is displayed on the monitor 30, a process of the CPU 52 is carried out in accordance with flowcharts shown in FIG. 11–FIG. 13. First, a mode selection menu is displayed on the monitor 30 in a step S31, the target H component values and the target C component values stored in the target value table (any one of 22i–22k) corresponding to the current mode are displayed on the monitor 30 in a step S33, and a first cursor C1 is set to a menu item showing the current mode in a step S35. The character signal generating circuit 34 is controlled in any of the steps S31–S33, and if the current mode is 1, a character shown in FIG. 14 is displayed on the through image in an OSD manner.

Figure 14:
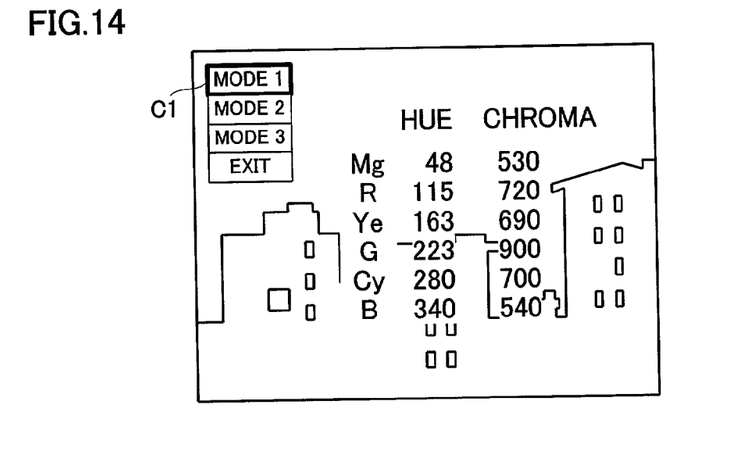
FIG. 14 is an illustrative view showing one example of a setting change screen.

According to FIG. 14, a mode selection menu formed of menu items of "MODE 1", "MODE 2", "MODE 3", and "EXIT" is displayed at an upper left of the screen, the six target H component values and the six target C component values read out from the target value table 22i corresponding to the MODE 1 is displayed at a center of the screen, and the first cursor C1 points out the "MODE 1". It is noted that characters of "hue" and "chroma", and "Mg", "R", "Ye", "G", "Cy", and "B" are brought into being associated with each of the target H component values and the target C component values.

It is determined whether or not the cursor key 46 is operated in a step S37, and if NO is determined, then the process directly proceeds to a step S49. However, if YES is determined, the first cursor C1 is moved to a desired direction in a step S39. A current pointing destination of the first cursor C1 is determined in a step S41, and if the pointing destination is "EXIT", a display of the target H component values and the target C component values is cancelled in a step S45 and then the process proceeds to the step S49.

If the pointing destination of the first cursor C1 is any one of "MODE 1", "MODE 2", and "MODE 3", the target H component values and the target C component values of the mode selected by the first cursor C1 is displayed on the monitor 30 in a step S43. More specifically, the target H component values and the target C component values are read out from the target value table (any one of 22i–22k) corresponding to the selected mode, and the character signal generating circuit 34 is instructed to display the read target H component values and the target C component values. The target H component values and the target C component values being displayed on the monitor 30 are renewed by the read target H component values and the read target C component values.

The target value table corresponding to the selected mode is validated in a step S47. The area determining circuit 22g shown in FIG. 2 executes a process shown in FIG. 7 by referring to the validated target table and the reference value table 22h in a step S47. Therefore, a color tone (color reproduction characteristic) of the through image displayed on the monitor 30 changes at every time that the first cursor C1 is moved among "MODE 1", "MODE 2" and "MODE 3".

It is determined whether or not the set key 50 is operated in the step S49, and if there is no key operation, the process returns to the step S37. However, if the key operation is performed, the pointing destination of the first cursor C1 is determined in a step S51. While the first cursor C1 selects "EXIT", NO is determined in the step S51. Then, the setting change mode is ended after validating the target value table of an initial mode (mode selected at a time of starting a process of the setting change mode) in a step S73.

On the other hand, if the pointing destination of the first cursor C1 is "MODE 1", "MODE 2", or "MODE 3", the process proceeds to a step S53 from the step S51 so as to copy the target H component values, the target C component values, and the target L component values of the target value table (any one of 22i–22k) corresponding to a mode selected by the first cursor C1 to the setting change-use table 22r. Furthermore, the setting change-use table 22r is validated in a step S55. A process in the step S55 causes the area determining circuit 22g shown in FIG. 2 to execute a process shown in FIG. 7 by referring to the setting change-use table 22r and the reference value table 22h.

A color selection menu is displayed on the monitor 30 in a step S57, an arrangement of the target H component values and the target C component values is changed in a step S59, and a second cursor C2 is set to "OK" in the color selection menu in a step S61. The character signal generating circuit 34 is controlled in any of the steps S57–S61, a character is displayed on the through image in an OCD manner on the monitor 30 shown in FIG. 15.

Figure 15:
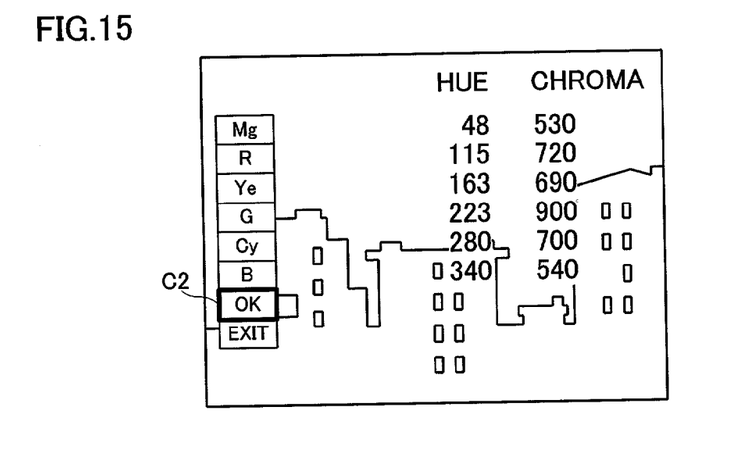
FIG. 15 is a an illustrative view showing another example of the setting change screen.

According to FIG. 15, the color selection menu formed of menu items of "Mg", "R", "Ye", "G", "Cy", "B", "OK", and "EXIT" is displayed at a left side of the screen, the six target H component values and the six target C component values are displayed at a slightly right side of the center of the screen, and the second cursor C2 points out "OK". It is noted that the six target H component values and the six target C component values are respectively brought into being associated with the menu items indicating the six representative colors.

It is determined whether or not the set key 46 is operated in a step S63, and if the key operation is performed, the current pointing destination of the second cursor C2 is determined in steps S65 and S71. If the pointing destination of the second cursor C2 is "OK", the process proceeds from the step S65 to a step S67 so as to store the target H component values, the target C component values, and the target L component values of the setting change-use table 22r into a reading source target value table. The reading source target value table is validated in a step S69, and then, the process is ended. On the other hand, if the pointing destination of the second cursor C2 is "EXIT", the process proceeds from the step S71 to a step S73 so as to validate the target value table of the initial mode, and then the process is ended.

The mode corresponding to the target value table validated in the step S69 or S73 becomes "a current mode" in the step S33 and S35 executed at a next time. It is noted that if the set key 50 is operated in a state where the second cursor C2 points out the menu item indicating the representative color, the key operation becomes invalidated.

If NO is determined in the step S63, it is determined whether or not the cursor key is operated in an up/down direction in a step S75. Herein, if NO is determined, the process returns to the step S63. However, if YES is determined, the second cursor C2 is moved to a desired direction in a step S77. In a subsequent step S79, a pointing destination of the second cursor C2 after the move is determined, and the process returns to the step S63 if the second cursor C2 selects "OK" or "EXIT".

In contrast, if the second cursor C2 selects a menu item indicating any one of the representative colors, the process proceeds from the step S79 to a step S81 so as to display only the target H component values and the target C component values corresponding to the selected representative color on the monitor 30. A third cursor C3 is set to the target H component values to be displayed in a step S83, and samples of a target color corresponding to the selected representative color are displayed on the monitor 30 as a first target color Clr1 and a second target color Clr2 in respective steps of S85 and S87.

In the step S85, more specifically, the target value (the target H component value, the target C component value, and the target L component value) of the selected representative color is detected from the setting change-use table 22r, and the detected target value is set to a first register 52a as a first target value, and the color signal generating circuit 36 is instructed to output a first color sample signal (first target color signal) in accordance with the first target values set to the first register 52a. In the step S87, the target value of the selected representative color (the target H component values, the target C component values, and the target L component value) is detected from the setting change-use table 22r, the detected target value is set to a second register 52b as a second target value, and the color sample signal generating circuit 36 is instructed to output a second color sample signal (second target color signal) in accordance with the second target values set to the second register 52b. The color sample signal generating circuit 36 outputs the first target color signal and the second target color signal responding to the instruction, and the outputted first target color signal and second target color signal are applied to the monitor 30 via the switch SW1.

Figure 16:
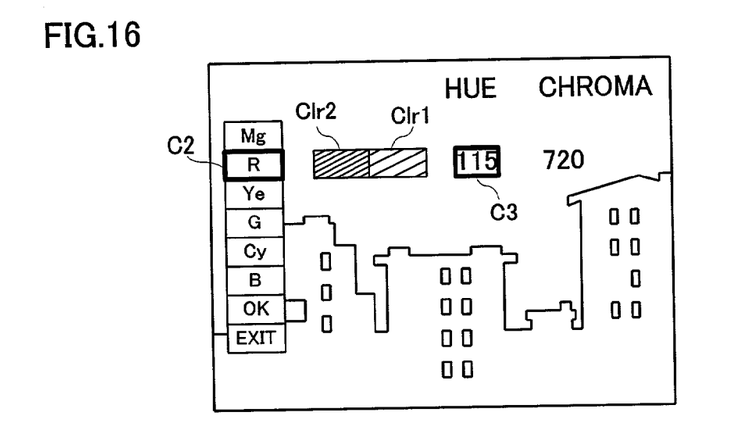
FIG. 16 is a an illustrative view showing the other example of the setting change screen.

Therefore, when the representative color "R" is selected from the color selection menu shown in FIG. 15, a screen display is renewed from FIG. 15 to FIG. 16. According to FIG. 16, only the target H component values (=115) and the target C component values (=720) corresponding to "R" are displayed, the third cursor C3 is set to the target H component values, and a first target color (first color sample) Clr1 and a second target color (second color sample) Clr2 of "R" are displayed to be brought closer with each other between the second cursor C2 and the third cursor C3.

It is determined whether or not the cursor key 46 is operated in an up/down direction in a step S89, it is determined whether or not the cursor key 46 is operated in a right/left direction in a step S95, and it is determined whether or not the dial key 48 is operated in a step S99.

If the cursor key 46 is operated in the up/down direction, YES is determined in the step S89, and then the cursor C2 is moved to a desired direction in a step S91. The menu item selected by the second cursor C2 after the move is determined in a step S93, and if the selected menu item is a representative color, the process returns to the step S81. In addition, if the selected menu is either "OK" or "EXIT", the process returns to the step S63. If the cursor key 46 is operated in the right/left direction, YES is determined in the step S95, and the third cursor C3 is moved to a desired direction in a step S97. The pointing destination of the third cursor C3 changes between the target H component values and the target C component values. The process returns to the step S89 after ending the step S97.

If the dial key 48 is operated, YES is determined in the step S99, and a numerical value the third cursor C3 points out (the target H component values or the target C component values) is renewed in a step S101. That is, the setting change-use table 22r and the first register 52a are accessed, and then the numerical value selected by the third cursor C3 is renewed in response to an operation of the dial key 48. Since the area determining circuit 22g refers to the setting change-use table 22r and the reference value table 22h, a color tone of the through image changes in response to the operation of the dial key 48. The color sample signal generating circuit 36 is instructed to output the first target color signal in accordance with the first target value (the target H component values, the target C component values, and the target L component value) set to the register 52a in a step S103. Accordingly, the color tone of the first target color Clr1 is also renewed. The process returns to the step S89 after ending the step S103.

As understood from the above descriptions, a plurality of reference values which respectively corresponds to a plurality of representative colors are held on the reference value table 22h, and a plurality of target values which respectively corresponds to a plurality of representative colors are held on the setting change-use table 22r. The image data of an object photographed by the CCD imager 14 is applied to the signal processing circuit 22, and subjected to a color adjustment based on the reference value held by the reference value table 22h and the target values held by the setting change-use table 22r. The image based on the image data to which the color adjustment is subjected is displayed on the monitor 30 in real-time. The image based on the image data to which the color adjustment is subjected is displayed on the monitor 30 in real-time.

If the desired representative color is selected by the cursor key 46 and the set key 50, the target H component values and the target C component values corresponding to the selected representative color and the first target color Clr1 and the second target color Clr2 corresponding to the selected representative color are displayed on the monitor 30 as shown in FIG. 16. The first target color to be displayed follows the first target value of the desired representative color held in the first register 52a, and the second target color follows the second target value of the desired representative color held in the second register 52b.

Herein, if one of the target H component value and the target C component value being displayed is selected, and then the dial key 48 is operated, the selected numerical value is changed corresponding to the key operation. At this time, the numerical value held on the setting change-use table 22r and the first register 52a are also changed simultaneously, and the real-time image and the color tone of the first target color being displayed on the monitor 30 are also changed corresponding to the key operation.

Thus, the through image, the target value, the first target color, and the second target color are displayed on the monitor 30. If the dial key 48 is operated, the target value on the monitor 30 is renewed, and the color tone of the through image and the first target color is changed. Since the target value to be displayed is renewed, it becomes possible to exactly adjust the color. Furthermore, since the color tone of the first target color and the through image is changed in correspondence to the key operation, it becomes possible to visually adjust the color. In addition, since the second target color, i.e. the target color according to the target value before the change and the first target color, i.e. the target color according to the target value after the change are displayed to be brought closer, it is possible to easily comprehend how the first target color changed by referring to the second target color. An advantage of displaying the first target color and the second target color is evidently found in a state where the representative color to be changed is not present in the through images. That is, even in a case that a color tone of red is to be changed while a through image of a landscape painting full of green, it is possible to easily comprehend a changing of the color tone corresponding to the key operation because the first target color and the second target color of "R" is displayed on the monitor 30.

In these regards, operability in applying a color adjustment is drastically improved, and in addition, it becomes possible to easily comprehend how a color reproduction characteristic changes.

It is noted that although only the target H component values and target C component values are to be arbitrarily changed out of the target H component values, target C component values, and the target L component value forming the target value in this embodiment, it is needless to say that the target L component value may be arbitrarily changed in addition to target H component values and the target C component values, or in place of at least one of the target H component values and the target C component values.

In addition, in this embodiment, the first target color and the second target color are displayed in such a manner as to be contacting with each other, however, it may be possible to form a ribbon-shaped gap between the first target color and the second target color. Furthermore, although the target H component values and the target C component values set to the setting change-use table are to be displayed on the monitor as they are in this embodiment, if a normalized target H component values and a normalized target C component values normalized in a range of −50 to +50 are to be displayed on the monitor, operability is further improved.

Furthermore, although three target value tables which respectively correspond to the MODE 1–3 are to be provided in the memory in this embodiment, a target value table to which a default target value is set may be stored in the memory in addition thereto. This makes it possible to carry out a setting operation in reference to the default target value if any one of the modes are not set.

Still furthermore, the CCD imager is used as an image sensor in this embodiment, a CMOS imager may be used instead of the CCD imager. In addition, a non-volatile semiconductor memory is used in this embodiment as a recording medium, an optical disk may be used instead thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   a holder for holding a plurality of color adjusting values which respectively corresponds to a plurality of representative colors;
   a photographer for photographing an object and outputting an image signal of the photographed object;
   an adjuster for subjecting the image signal outputted from said photographer to a color adjustment based on the plurality of color adjusting values held by said holder;
   an image displayer for displaying in real-time an image based on the image signal to which said color adjustment is subjected, wherein a first color sample displayer and a second color sample displayer are operative to display simultaneously a first color sample and a second color sample, respectively, over a portion of said image, said first and second color samples both correspond to the same color adjusting value of said plurality of color adjusting values, and said first and second color sample displayers are operative to display color samples of a particular color that is not present in said image; and
   a changer for arbitrarily changing the plurality of color adjusting values held by said holder, said changer being operative to change the plurality of color adjusting values by varying the first color sample while the second color sample remains unchanged.

2. A digital camera according to claim 1, wherein said changer includes a first acceptor for accepting a selection of a desired representative color out of the plurality of representative colors, a second acceptor for accepting a change instruction of the color adjusting value, and a color adjusting value changer for changing the color adjusting value corresponding to the desired representative color in response to the change instruction.

3. A digital camera according to claim 1, further comprising an adjusting value displayer for displaying a color adjusting values corresponding to at least one of representative colors out of the plurality of color adjusting values held by said holder.

4. A digital camera according to claim 1, wherein the color adjusting value is a numerical value which defines at least one of a hue and a chroma.

5. A color adjusting apparatus which subjects an image signal to a color adjustment based on color adjusting values stored in a first memory, comprising:
   a first color sample displayer for displaying a first color sample in accordance with the color adjusting values stored in said first memory;
   a transferor for transferring the color adjusting values stored in said first memory to a second memory;
   a second color sample displayer for displaying a second color sample in accordance with the color adjusting values stored in said second memory;
   an acceptor for accepting a change instruction of the first color sample;
   a changer for changing the color adjusting values stored in said first memory in response to the change instruction; and
   an object image displayer for displaying in real-time an object image based on the image signal to which the color adjustment is subjected,
   wherein said first color sample displayer and said second color sample displayer are operative to display simultaneously said first color sample and said second color sample, respectively, over a portion of said object image.

6. A color adjusting apparatus according to claim 5, wherein said second color sample displayer displays the second color sample in a vicinity of the first color sample.

7. A color adjusting apparatus according to claim 5, further comprising a photographer for photographing an object, wherein the image signal is an image signal outputted from said photographer.

8. A digital camera, comprising:
   a holder for holding a plurality of color component values, which include a specific color component value being changeable;
   an imaging device for carrying out a photographing process to repeatedly photograph an object scene;
   a color adjuster for subjecting each of a plurality of object scene images obtained by the photographing process to a color adjustment based on the plurality of color component values held by said holder;
   an image displayer for carrying out, in parallel with the photographing process, an image displaying process to display a moving image formed by a plurality of object scene images on which the color adjustment has been performed by said color adjuster;

a changer for changing the specific color component value held by said holder; and a color information displayer for carrying out, in parallel with the photographing process, a color information displaying process to display color information corresponding to the specific color component value, which has been changed by said changer, wherein the color information displayed by said color information displayer is independent from the moving image displayed by said image displayer, wherein said color information displayer includes a first color sample displayer for displaying a first color sample having a color defined by the specific color component value which has been changed by said changer as the color information; and wherein said first color sample displayer displays the first color sample over a potion of the moving image displayed by said image displayer.

9. A digital camera, comprising:

a holder for holding a plurality of color component values, which include a specific color component value being changeable;

an imaging device for carrying out a photographing process to repeatedly photograph an object scene;

a color adjuster for subjecting each of a plurality of object scene images obtained by the photographing process to a color adjustment based on the plurality of color component values held by said holder;

an image displayer for carrying out, in parallel with the photographing process, an image displaying process to display a moving image formed by a plurality of object scene images on which the color adjustment has been performed by said color adjuster;

a changer for changing the specific color component value held by said holder; and a color information displayer for carrying out, in parallel with the photographing process, a color information displaying process to display color information corresponding to the specific color component value, which has been changed by said changer, wherein the color information displayed by said color information displayer is independent from the moving image displayed by said image displayer, wherein said color information displayer includes a first color sample displayer for displaying a first color sample having a color defined by the specific color component value which has been changed by said changer as the color information; and wherein the first color sample has a particular color that is not present in the moving image displayed by said image displayer.

* * * * *